United States Patent
Koops et al.

(10) Patent No.: US 6,504,143 B2
(45) Date of Patent: *Jan. 7, 2003

(54) DEVICE FOR INPUTTING DATA

(75) Inventors: Hans Wilfried Koops, Ramstadt (DE); Ulrich Koops, Ramstadt (DE)

(73) Assignee: Deutsche Telekom AG, Bonn (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/194,554

(22) PCT Filed: May 21, 1997

(86) PCT No.: PCT/EP97/02575

§ 371 (c)(1), (2), (4) Date: Sep. 10, 1999

(87) PCT Pub. No.: WO97/46000

PCT Pub. Date: Dec. 4, 1997

(65) Prior Publication Data

US 2002/0104955 A1 Aug. 8, 2002

(30) Foreign Application Priority Data

May 29, 1996 (DE) .......................................... 196 21 362
May 20, 1997 (DE) .......................................... 197 20 925

(51) Int. Cl.⁷ .............................................. H01J 40/14
(52) U.S. Cl. ....................................... 250/221; 345/175
(58) Field of Search ........................... 250/221, 559.29, 250/206.1, 227.22, 216, 549, 208.1, 208.2, 208.3, 229; 356/375, 3.06, 3.08; 345/173, 175, 176; 340/540, 541, 545.3, 567

(56) References Cited

U.S. PATENT DOCUMENTS

| | | | |
|---|---|---|---|
| 4,733,096 A | * 3/1988 | Horiguchi | 358/482 |
| 5,103,085 A | * 4/1992 | Zimmerman | 250/221 |
| 5,130,531 A | 7/1992 | Ito et al. | |
| 5,225,689 A | * 7/1993 | Buckle et al. | 250/559.4 |
| 5,340,978 A | * 8/1994 | Rostoker et al. | 250/208.1 |
| 5,347,275 A | * 9/1994 | Lau | 341/20 |
| 5,424,533 A | * 6/1995 | Schmutz | 250/221 |

FOREIGN PATENT DOCUMENTS

| | | |
|---|---|---|
| DE | 31 40 217 | 5/1982 |
| DE | 36 43 576 | 7/1987 |
| DE | 44 16 597 | 11/1995 |
| DE | 195 45 484 | 6/1997 |

* cited by examiner

Primary Examiner—Que T. Le
Assistant Examiner—Thanh X. Luu
(74) Attorney, Agent, or Firm—Kenyon & Kenyon

(57) ABSTRACT

In an apparatus for the input of information, it is provided that a raster or an array of light-emitting screen elements is associated with a raster or an array of photodetectors, the light emitted by at least one of the screen elements being reflected to at least one of the photodetectors when an object approaches the apparatus; it is further provided that output signals of the photodetectors are used to obtain information on which of the photodetectors are receiving reflected light.

16 Claims, 2 Drawing Sheets

DEVICE FOR INPUTTING DATA

FIELD OF THE INVENTION

The present invention relates to an apparatus for the input of information.

RELATED TECHNOLOGY

Various apparatuses have become known for the input of information in conjunction with a screen. Thus, it is known, for example, to point at a screen with a so-called light pen. Located in the tip of the light pen is a photodetector which emits an output signal when the area of the screen covered by the photodetector is scanned by the writing beam of the screen. From the position of said signal with respect to time it is possible to deduce the location of the light pen. Consequently, it is possible, first, to mark an image detail and, second, also to write on the screen.

Further apparatuses for the input of information in conjunction with a screen are so-called touch-screen devices, which are pressure-sensitive or work on a capacity basis. Such devices are presently available from component manufacturers as an addition for picture tubes and flat screens, for example in the catalogue Elektronika, Munich 1995. The measurement of capacity or a change in pressure or resistance in the matrix-addressed plastic sheet applied to the screen is identified by corresponding computer programs and is assigned to the functions and information or program steps placed underneath in masks.

SUMMARY OF THE INVENTION

An object of the present invention is to indicate an apparatus for the input of information, said apparatus being able to be manufactured both as a built in (self-contained) apparatus and also as an addition for a screen.

The object of the invention is achieved, in that a raster of light-emitting screen elements is associated with a raster of photodetectors and with a raster of lenses, in that the lenses, the screen elements and the photodetectors are spaced out in such a manner that the emitted light is not-focused and the light emitted by at least one of the screen elements and reflected by an object as said object approaches the apparatus is focused onto at least one of the photodetectors, and in that output signals of the photodetectors are able to be supplied to an evaluation apparatus in order to obtain information on which of the photodetectors are receiving reflected light.

A raster of lenses associated with the raster of screen elements and the raster of photodetectors is provided, the lenses, the screen elements and the photodetectors being spaced apart so that light is not focused. When an object nears the device, light emitted by at least one of the screen elements is focused onto at least one of the photodectors.

The apparatus according to the invention allows specified information entered (to be input) by pointing at it. Input is achieved by the controlled interplay of the image-reproduction function and the image-recording function in the apparatus according to the invention. The selectable information is output in programmed manner through the image-reproduction function of the screen and is shown on the screen as an existing image with different brightnesses and, where appropriate, colors. Using a finger or a reflecting object, the information can be selected by pointing at the area in which the information is displayed and by bringing the finger near to the screen. It is equally possible to use a light-emitting pointer.

The number of photodetectors and light-emitting screen elements may be chosen to suit the requirements. The numbers of screen elements customary in television technology and computer screens, such as 600×800, may be used for the representation of images to whose resolution an observer is accustomed and which have a high information content. Through a large-area embodiment of the apparatus according to the invention, for example in DIN A4 format, the demands on the lithographic processes and the resolution thereof are lower and, consequently, the costs of the manufacturing machines are relatively low. These can also be implemented through the modification of conventional printing presses.

The phosphors customary in picture tubes may be used as the emitting screen elements, said phosphors being irradiated with electrons by spaced-apart electron sources to which corresponding voltage is applied. The electron sources are preferably field-emitter arrangements which may be produced by corpuscular-beam deposition.

The photodetectors may consist of nanocrystalline composite material produced by corpuscular-beam-induced deposition and described in German patent application 196 21 175.1.

Preferably, it is provided in the device according to the invention that each light-emitting screen element is associated with one photodetector. Depending on the specific requirements, however, it is also possible to employ different numbers of screen elements and photodetectors.

The use of the apparatus according to the invention as a "flat camera" is enabled (made possible) according to an embodiment of the invention in that a converging lens is positioned in front of each photodetector.

A further development of the apparatus according to the invention consists in that, for screen areas each formed by a reproduced mask, in that the intensity measured by the therein situated photodetectors is compared with a known background intensity and in that, when the intensity exceeded the background intensity, it is detected that the object is approaching.

This further development of the invention prevents interference from stray light, which on the one hand, may penetrate from outside and, on the other hand, may be caused by the light-emitting screen elements themselves.

The further development of the invention may preferably be such that the background intensity of the apparatus during times, at which the object is not approaching, is measured and stored in a memory, it being advantageous to provide a computer with screen-comparison routines for comparison and detection.

A particularly advantageous embodiment of the further development of the invention consists in that a memory is provided for at least one mask, the mask preferably being of such design that a minimum light intensity is radiated by those areas of the light-emitting screen elements in which an input is required to be possible. This ensures that, in the area of those photodetectors which are required to detect an input, there is sufficient light for reflection.

In order, however, to prevent the light emitted by the screen elements from likewise entering the photodetectors and interfering with the evaluation process, it may be provided in the apparatus according to the invention that the photodetectors are shielded from the light-emitting screen elements by a light-impermeable layer. Additionally or alternatively, it may also be provided in the apparatus according to the invention that, inside each of the areas, a lower or no light intensity is radiated by those screen elements situated in the direct vicinity of photodetectors from whose output signals information is obtained. Nevertheless, the undirected light propagated from the screen elements ensures sufficient illumination of the object in front of the lenses in front of the photodetectors.

For the purpose of input an additional separation between ambient light and the light emitted by the screen elements may, according to a further embodiment of the invention, be accomplished in that the light emitted by the screen elements is modulated and in that the output signals of the photodetectors are sent through filters which allow the modulation signal to pass.

This measure may, in that different modulation signals and different filters are provided for different areas, also be used for further location selection. In this connection, attention is also drawn to the fact that the apparatus according to the invention is capable not only of evaluating one single approaching object but also of evaluating a plurality of objects.

Furthermore, the apparatus according to the invention may be used not only for the input of information but also for the display of any images and for the recording of images of objects brought in front of the apparatus according to the invention. In another further development of the apparatus according to the invention, therefore, operation in three phases is provided, wherein during a first phase, the screen elements are energized for the reproduction of an image;

in a second phase, the screen elements emit no light while the output signals of the photodetectors are evaluated for image recording and in a third phase, the screen elements emit light and the output signals of the photodetectors are evaluated in order to obtain the information to be input.

If the camera function is not required, the apparatus according to the invention may also readily be operated with two phases, namely the first and third phases.

This further development of the invention is preferably designed such that the repetition frequency of the three or two phases is greater than the flicker frequency perceptible by the human eye and/or that the duration of the third phase is considerably shorter than the duration of the first phase. This ensures the flicker-free reproduction of the image, which is extensively free from interference through the mask displayed during the input phase.

The apparatus according to the invention may, on the one hand, be in the form of an independent unit characterized by the apparatus being in the form of a plate-shaped body in which both the light-emitting screen elements and also the photodetectors are located. On the other hand, however, it is also possible to retrofit existing screens by the apparatus being in the form of a plastic sheet, said plastic sheet containing the photodetectors and conductors for derivation of the output signals of the photodetectors and being adapted to be applied to a screen containing the light-emitting screen elements.

BRIEF DESCRIPTION OF THE DRAWINGS

Samples of the invention are explained in greater detail in the following description and are presented in the drawings, in which.

DETAILED DESCRIPTION

Figure 1:
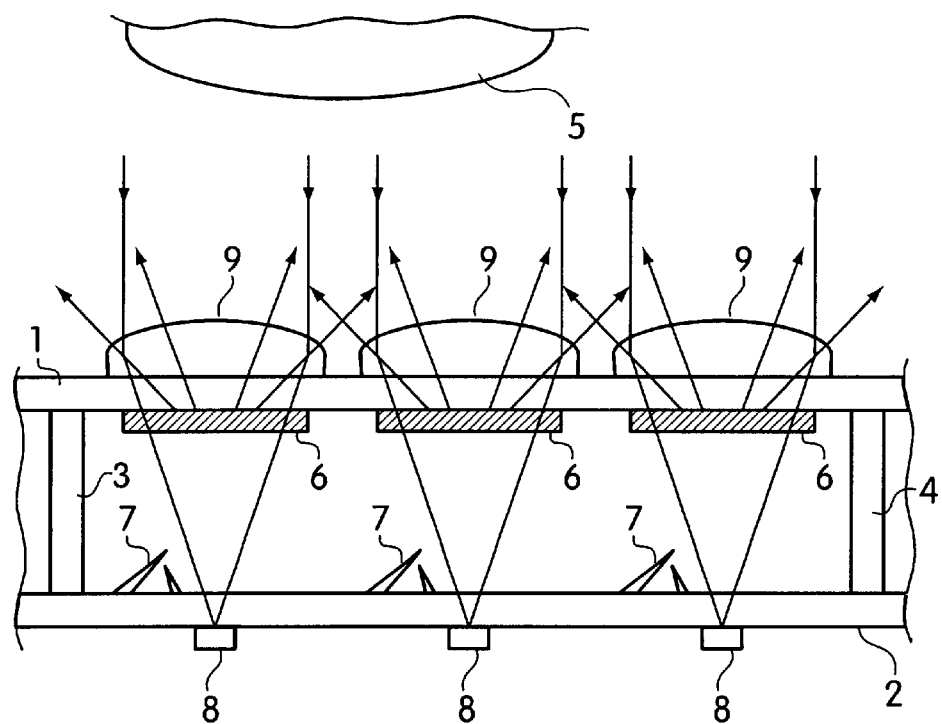
FIG. 1 shows a detail of an apparatus according to the invention, in the form of a cross section.

In the embodiment shown in FIG. 1, two parallel glass plates 1, 2 are kept apart by spacers 3, 4 and enclose an evacuated hollow space. The inside of the glass plate 1 is provided with screen elements 6 which emit light in known manner under bombardment by electrons produced by electron sources 7. Image-reproduction apparatuses of this kind are described, for example, in DE 44 16 597 A1. Therefore explanatory remarks are not therefore necessary for an understanding of the present invention in detail.

On the glass plate 2 there are photodetectors 8 which are each located in the focal plane of one of the lenses 9. There is a description of this in DE 195 45 484 A1. The converging lenses cause the incident light, say from the direction of the optical axis of the lens, to strike the associated photodetector 8. With regard to the screen elements 6, however, the lens does not act as a converging lens, with the result that the image formed by the screen elements through suitable energization is visible over a large angle.

The intensity of the light emitted by the screen elements 6 decreases quickly with distance. If, however, an object 5 approaches the apparatus according to the invention, it is relatively brightly illuminated, given corresponding energization of the screen elements 6, and reflects light through the converging lenses 9 directed at it to the behind-lying photodetectors 8.

The signals of the photodetectors 8 can, as usual with other image sensors, be read out and evaluated row by row, with the result that, ultimately, signals are available to indicate the point at which an object is approaching the entire apparatus according to the invention, it also being possible for a plurality of objects to be detected.

A plurality of measures is possible in order to prevent the photodetectors 8 from responding to the light emitted by the screen elements towards the glass plate 2. Thus, for example, the screen elements may be visually shielded in the direction of the glass plate 2 by means of a light-impermeable layer, it having to be ensured, through a suitable offset between the screen elements 6, on the one hand, and the lenses 9 and the photodetectors 8, on the other hand, that the photodetectors 8 are exposed to incident light.

Another possibility for adversely affecting the evaluation process through light radiated backwards by the screen elements comprises not energizing those screen elements located in front of one or more photodetectors whose signals are to be evaluated. An object coming in front of these photodetectors is also adequately illuminated owing to the large radiation angle of the emitting adjacent screen elements.

Finally, the compensation of the backwards emitted light together with light incident from outside which is not reflected by an approaching object is possible in that, in a calibration phase, i.e. when no object is in the vicinity of the apparatus according to the invention, the output signals of the photodetectors are measured and stored. In order to indicate objects as they approach, all that is then required is to perform a comparison with the stored values.

Figure 2:
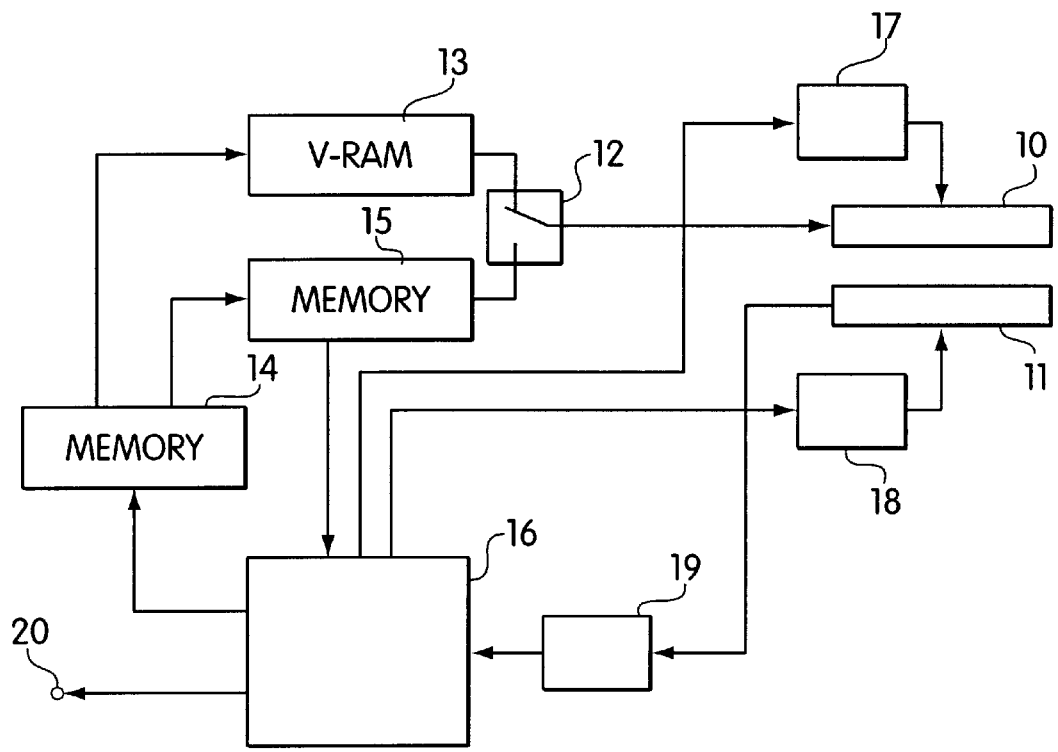
FIG. 2 shows a block diagram of an apparatus according to the invention with an example of an energization and evaluation circuit.

FIG. 2 shows an apparatus according to the invention with a schematic representation of the energization and evaluation circuits. The apparatus according to the invention is itself divided into two parts, namely into the raster of light-emitting screen elements 10 and into a raster of photodetectors 11. Since these two parts may serve as image-reproduction apparatus and as re-recording apparatus, they are in the following, for the sake of simplicity, referred to as screen 10 and camera 11.

Figure 3:
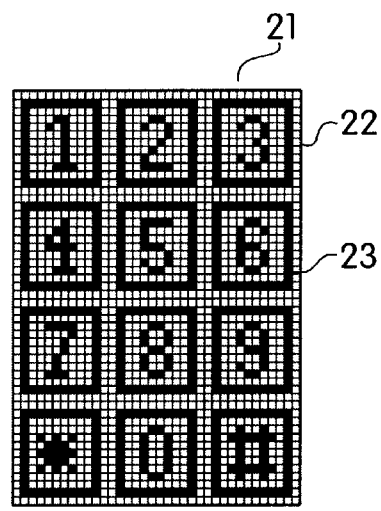
FIG. 3 shows an image reproduced with the aid of the apparatus according to the invention.

In the schematic representation of the energization and evaluation circuits, it is assumed that, for many applications, it is advantageous if the image visible to a user differs from a mask which is displayed with the aid of the screen elements only in order to have favorable optical conditions for the evaluation of the output signals of the photodetectors. Therefore, two sources are provided for the energization of the screen 10, said sources selectively having access to the screen via a selector switch 12. One of the sources is a video RAM 13 in which an image to be displayed is temporarily stored in the form of a line raster. The relevant data is taken from a memory 14. The image may, for example, as represented schematically in FIG. 3, show a keypad. It is, however, also possible for any other image contents to be shown. As is usual in the reproduction of video signals, the image is written during the majority of the image period of, for example, 1/60 second. During this time, the selector switch 12 is in the upper position.

During the remaining time, the selector switch is brought into the lower position, with the result that a mask stored in a memory 15 acting as another source is displayed briefly on the screen 10. In the simplest case, the mask may consist in that all the screen elements are set to maximum intensity. However, it is also possible to employ other masks. An example thereof will be explained later in connection with FIG. 4.

It is also perfectly possible for the mask to be variable with respect to time, with the result that the intensity of the screen elements is modulated. This makes it possible to compensate for the effect of extraneous light. If the modulation is location-dependent, additional information can be generated regarding the location of the approaching object.

A processor 16 controls the entire sequence of operations in the apparatus according to the invention including a raster generator 17, 18 each for the screen 10 and the camera 11. The processor 16 further evaluates the output signals of the camera 11, which output signals have been previously preprocessed at 19, for example through amplification and filtering, with the result that data is available at an output 20 indicating the places at which one or more objects are approaching the apparatus according to the invention.

Figure 4:
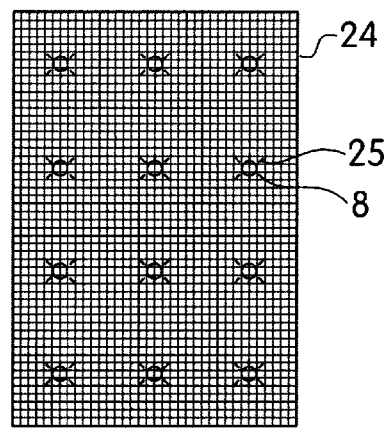
FIG. 4 shows a mask reproduced briefly with the apparatus according to the invention.

FIGS. 3 and 4 show an apparatus according to the invention used as a telephone keypad. For this purpose, the screen 10 (FIG. 2) is supplied in the image-reproduction phase with signals which produce the image 21 with depictions of keys 23 as shown in FIG. 3, each square representing a screen element 22. For the sake of simplicity, relatively large screen elements 22 have been assumed.

During the input phase, the mask 24 shown in FIG. 4 is reproduced on the screen 10. In this connection, all screen elements—with the exception of those screen elements 25 shown shaded, which are situated in the immediate surroundings of the photodetectors 8 represented by circles in FIG. 4—are brightened. The input phase is so short that it does not interfere with the viewing of the image shown in FIG. 3.

Figure 5A:
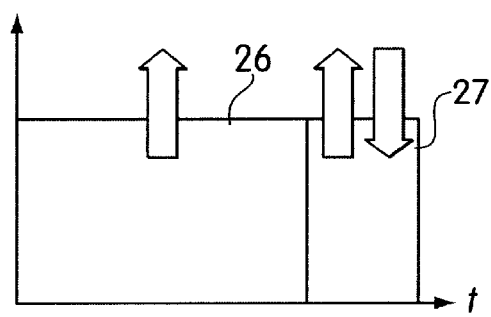
FIGS. 5a and 5b show the time sequence of individual phases with an apparatus according to the invention, said apparatus being able to be used both for image reproduction and also for image recording and as an input apparatus.
Figure 5B:
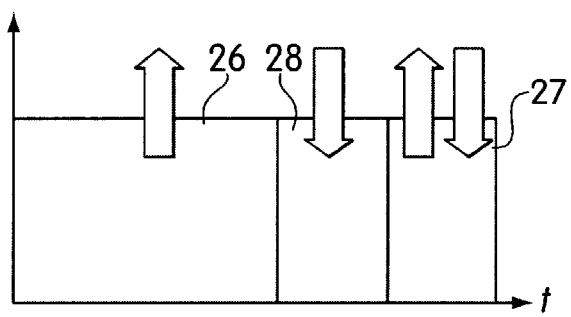

FIG. 5a shows the sequence with respect to time of the image-reproduction phase 26 and of the input phase 27, the duration of which is shown enlarged in the representation. The sequence shown in FIG. 5b additionally includes an image-recording phase 28 in which the screen 10 is not energized, with the result that the camera 11 records the image which is in front of it. The arrows in FIGS. 5a and 5b illustrate the light which is emitted by the screen elements in the respective phase and the light which is indicated by the photodetectors.

Figure 6:
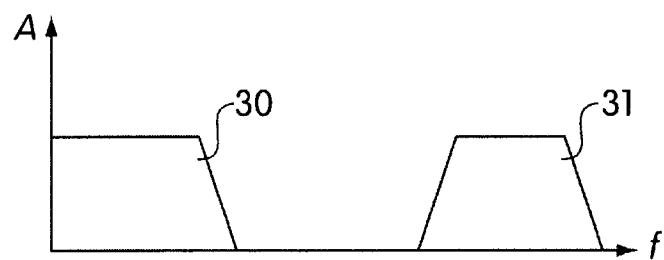
FIG. 6 shows a schematic representation of frequency ranges for individual functions of the apparatus according to the invention in the case of a different embodiment.

The spectral distribution represented in FIG. 6 may be selected in order to suppress those components in the output signals of the photodetectors caused by extraneous light—for example by fluorescent tubes. In this connection, the image frequencies used for image reproduction and image recording are in a lower frequency range 30, while frequencies in the range 31 are used for the modulation of the emitted light during the input phase.

What is claimed is:

1. A data input device comprising:

an array of light-emitting screen elements;

an array of photodetectors associated with the array of screen elements;

an array of lenses associated with the array of screen elements, the lenses, screen elements and photodetectors being spaced apart so that light emitted by the screen elements is not focused when an object is not near the device, and that when the object is near the device, light emitted by at least one of the screen elements is reflected by the object and is focused onto at least one of the photodetectors; and an evaluation apparatus receiving output signals from the photodetectors so as to be able to determine which of the photodetectors receives the reflected light;

wherein the light emitting screen elements are on a screen, screen areas of the screen being each formed by a plurality of the light emitting screen elements which are programmable to form an output on the screen, so that intensity measured by the photodetectors is compared to a background intensity and, when the background intensity is exceeded, the object is ascertained as near so as to input the data in accordance with the programmable plurality of the light emitting screen elements.

2. The device as recited in claim 1 wherein each of the screen elements is associated with one of the photodetectors.

3. The device as recited in claim 1 wherein the lenses are converging lenses, one of the lenses being positioned in front of each of the photodetectors.

4. The device as recited in claim 1 further comprising a memory, the background intensity being measured and stored in the memory during times when the object is not near the device.

5. The device as recited claim 1 further comprising a microprocessor connected to the photodetectors for comparison and detection.

6. The device as recited in claim 1 further comprising a memory for storing coordinates and respective intensities of the programmable plurality of the light emitting screen elements.

7. The device as recited in claim 1 wherein the programmable plurality of the light emitting screen elements is designed so that areas of the light-emitting screen elements where an input is required can radiate a minimum light intensity.

8. The device as recited in claim 1 wherein the photodetectors are shielded from the light-emitting screen elements by an optically opaque layer.

9. The device as recited in claim 1 wherein inside each of the screen areas, a lower light intensity or no light intensity is radiated by the screen elements disposed in the immediate vicinity of the photodetectors.

10. The device as recited in claim 1 wherein light emitted by the screen elements is modulated so as to provide modulated output signals, and the output signals from the photodetectors are sent through filters, the filters allowing the modulated output signals to pass.

11. The device as recited in claim 10 wherein the screen elements are on a screen, a programmable plurality of the light emitting screen elements on the screen forming screen areas, and wherein different modulation signals and different filters are provided for different screen areas.

12. The device as recited in claim 1 further comprising a plate-shaped body on which the light-emitting screen elements and the photodetectors are disposed.

13. The device as recited in claim 1 further comprising a plastic sheet, the photodetectors and conductors for the output signals from the photodetectors being disposed on the plastic sheet, the plastic sheet being able to fit on a screen containing the light-emitting screen elements.

14. A method for inputting information to a device having an array of light-emitting screen elements, an array of photodetectors associated with the array of screen elements, and an array of lenses associated with the array of screen elements, the lenses, screen elements and photodetectors being spaced apart so that light emitted by the screen elements is not focused when an object for causing the inputting of information is not near the device, and light emitted by at least one of the screen elements is reflected by the object when the object nears the device and is focused onto at least one of the photodetectors, the photodetectors having output signals, the method comprising:

energizing the screen elements during a first phase to reproduce an image;

during a second phase, de-energizing the screen elements so that the screen elements emit no light and evaluating the output signals from the photodetectors for image recording; and in a third phase, energizing the screen elements so that the screen elements emit light and evaluating the output signals from the photodetectors so as to be able to determine which of the photodetectors receives the reflected light and thereby to obtain information to be input;

wherein the light emitting screen elements are on a screen, screen areas of the screen being each formed by a reproduced programmable plurality of the light emitting screen elements which are programmable to form an output on the screen, so that intensity measured by the photodetectors is compared to a background intensity and, when the background intensity is exceeded, the object is ascertained as near so as to input the information in accordance with the programmable plurality of the light emitting screen elements.

15. The method as recited in claim 14 wherein a repetition frequency of the first, second and third phases is greater than a flicker frequency perceptible to a human eye.

16. The method as recited in claim 14 wherein a duration of the third phase is considerably shorter than a duration of the first phase.

* * * * *